US012373523B2

(12) United States Patent
Cabrera Lozoya et al.

(10) Patent No.: US 12,373,523 B2
(45) Date of Patent: *Jul. 29, 2025

(54) MACHINE-LEARNING FOR PASSWORD GUESS RISK DETERMINATION

(71) Applicant: SAP SE, Walldorf (DE)

(72) Inventors: Rocio Cabrera Lozoya, Antibes (FR); Slim Trabelsi, Biot (FR); Carlos Rafael Ocanto Davila, Neuilly sur Seine (FR)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/659,463

(22) Filed: May 9, 2024

(65) Prior Publication Data
US 2024/0289427 A1 Aug. 29, 2024

Related U.S. Application Data

(63) Continuation of application No. 17/668,208, filed on Feb. 9, 2022, now Pat. No. 12,001,530.

(51) Int. Cl.
*G06F 21/00* (2013.01)
*G06F 21/31* (2013.01)
*G06F 40/253* (2020.01)
*G06F 40/263* (2020.01)
*G06F 40/40* (2020.01)

(52) U.S. Cl.
CPC ............ *G06F 21/31* (2013.01); *G06F 40/253* (2020.01); *G06F 40/263* (2020.01); *G06F 40/40* (2020.01)

(58) Field of Classification Search
CPC ...... G06F 21/31; G06F 40/253; G06F 40/263; G06F 40/40; G06F 21/46; G06F 40/30
See application file for complete search history.

(56) References Cited

U.S. PATENT DOCUMENTS 8,539,247 B2 * 9/2013 McGrew ................ G06F 21/31
 713/182
9,325,499 B1 * 4/2016 Juels ..................... H04L 9/0861
(Continued)

FOREIGN PATENT DOCUMENTS

WO WO-2017106669 A1 * 6/2017 ............. G06F 21/00

OTHER PUBLICATIONS

Chatterjee et al., "Cracking-Resistant Password Vaults using Natural Language Encoders", 2015 IEEE Symposium on Security and Privacy, Date of Conference: May 17-21, 2015.*
(Continued)

*Primary Examiner* — Morshed Mehedi
(74) *Attorney, Agent, or Firm* — SCHWEGMAN LUNDBERG & WOESSNER, P.A.

(57) ABSTRACT

In an example embodiment, an efficient, automated method to generate password guesses is provided by leveraging online text sources along with natural language processing techniques. Specifically, semantic structures in passwords are exploited to aid system in generating better guesses. This not only helps cover instances where traditional password meters would indicate a password is safe when it is not, but also makes the solution robust against fast-evolving domains such as new slang in natural languages or new vocabulary arising from new products, product updates, and services.

20 Claims, 6 Drawing Sheets

(56) References Cited

U.S. PATENT DOCUMENTS 9,438,419 B1 * 9/2016 Aggarwal ............. H04L 9/0863
2023/0252114 A1 8/2023 Cabrera Lozoya et al.

OTHER PUBLICATIONS

"U.S. Appl. No. 17/668,208, Notice of Allowance mailed Feb. 5, 2024", 12 pgs.

Ma, et al., "A Study of Probabilistic Password Models", IEEE Symposium on Security and Privacy, (2014), 16 pgs.

* cited by examiner

MACHINE-LEARNING FOR PASSWORD GUESS RISK DETERMINATION

CROSS-REFERENCE TO RELATED APPLICATIONS

This application is a continuation of prior application Ser. No. 17/668,208, filed on Feb. 9, 2022, which is incorporated by reference herein in its entirety.

TECHNICAL FIELD

This document generally relates to machine learning. More specifically, this document relates to the use of machine learning for password guess risk determination.

BACKGROUND

Passwords are currently the main means of controlling access to restricted information or services (e.g., emails, bank accounts, workstations, etc.). This is especially true for computers and Internet-related components and software, which almost universally utilize passwords as at least part of an access control method.

Hackers use various techniques to attempt to obtain access to user accounts, including attempting to guess passwords (either manually or using automated programs).

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
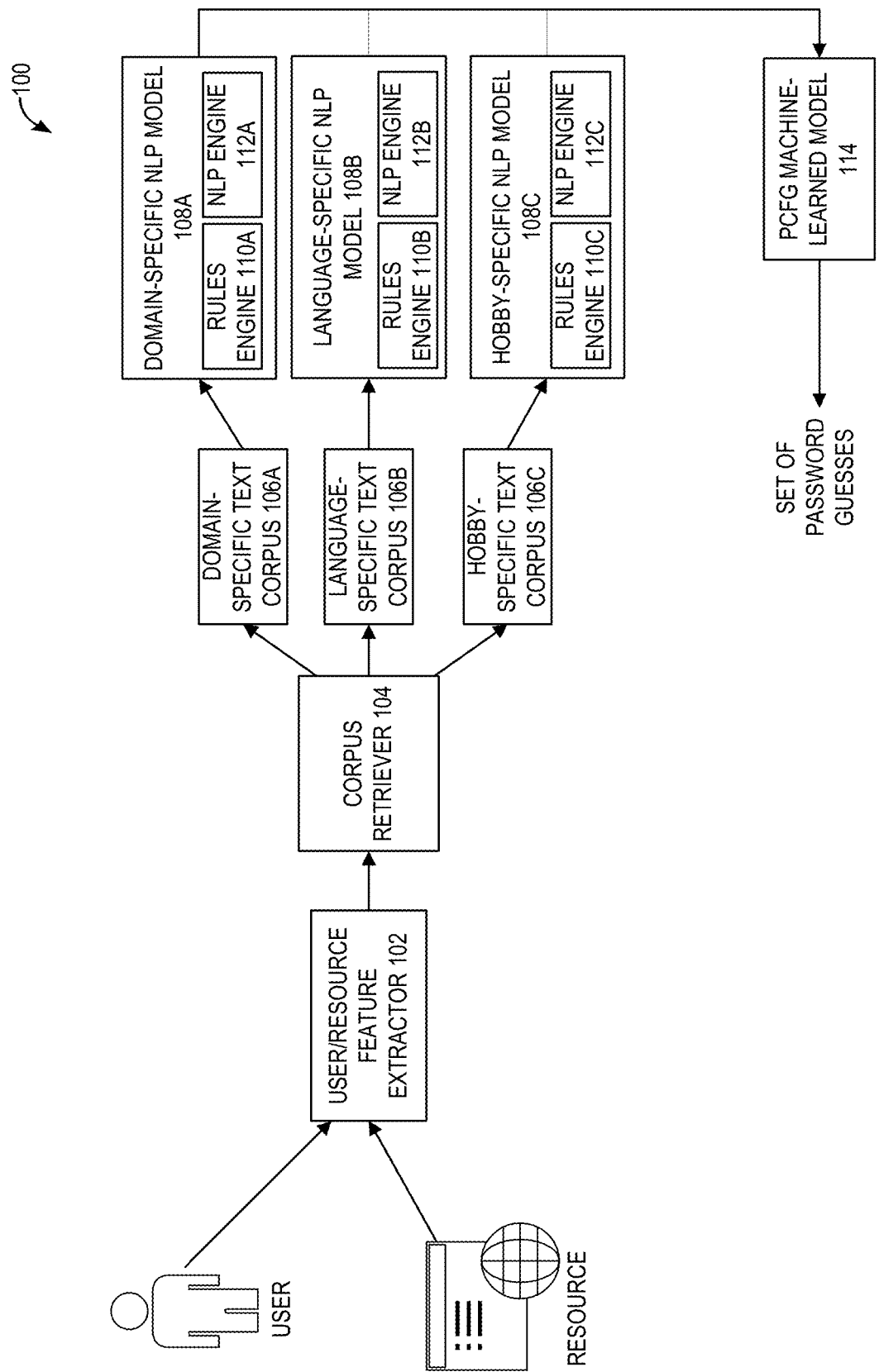
FIG. 1 is a block diagram illustrating a system 100 for generating password guesses using machine learning, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, machine learning is used to identity easily guessable passwords by leveraging available resources with strong sociocultural information. These easily guessable passwords can then be used by a password strength meter to guide users to choose more robust and harder to guess passwords.

Particularly, safe passwords (e.g., long, uncorrelated sequence of characters in complex patterns) are harder for humans to remember so users gravitate towards easier-to-remember passwords. Indeed, it has been discovered that the choice of passwords is driven by the social and cultural influences of the user, be it native language, country of origin, hobbies, religion, among others.

In order to protect restricted information, it is desirable for users to avoid passwords which are easy to crack. In order to help users choose safer passwords, it is possible to provide a password strength meter to the user during the selection process. Here, a user will type in a desired password and the password strength meter will return an indication of whether the password is safe (and, in some cases, how safe).

Existing password strength meters, however, use rule-based criteria, entropy measures or other heuristics to rate a password. Nevertheless, in order to keep up with the evolution of password selection, there is a need for a robust way to automate the analysis of passwords influenced by social cues (particularly those related to media and pop culture, which evolve rapidly).

More particularly, existing password strength meters, even when automated in nature, still can indicate a password as safe when it is easily guessed based on domain, geographic, user hobbies, or other context-based information. For example, it is common in passwords used to access online gaming accounts for users to utilize names of characters, objects, and other aspects of the game itself as part or all of their password. These aspects of an online game, and indeed online games themselves, are constantly changing, making it challenging to integrate such information into a password strength meter. Additionally, traditional password strength meters are not set up to utilize such information anyway, as they are more geared towards general rules that can be easily applied to large numbers of systems. For example, a password meter might utilize password guess rules such as (1) the password should be 12 or more characters long; (2) the password should contain both capital and lowercase letters; (3) the password should contain at least one special character (e.g., !, ?, *, etc.); and (4) the password should contain a mix of letters and numbers. In such a case, however, the password meter might inform a user that a password such as "TherontheCleric1!" is safe, but that would not be the case if, for example, there is a character in the game named "Theron the Cleric."

Likewise, a password meter may indicate that a password of "goDodgers2023!" may be safe, even though it common for users in the United States to use sports team names in their passwords along with a year as the numerical portion of the password.

The result in both cases is the user believes a safe password has been created when in fact the opposite has occurred.

In an example embodiment, an efficient, automated method to generate password guesses is provided by leveraging online text sources along with natural language processing techniques. Specifically, semantic structures in passwords are exploited to aid system in generating better guesses. This not only helps cover instances where traditional password meters would indicate a password is safe when it is not, but also makes the solution robust against fast-evolving domains such as new slang in natural languages or new vocabulary arising from new products, product updates, and services.

FIG. 1 is a block diagram illustrating a system 100 for generating password guesses using machine learning, in accordance with an example embodiment. A user/resource feature extractor 102 allows the system 100 to narrow down the domains of spaces of possible password guesses by extracting information about the targeted user or resource. User information can include information retrieved from a user profile established for the targeted user by or related to the resource. For example, in the example where the resource is an online game, the user may have completed a brief profile when registering for the online game, which may include information such as the user's language preference, geographic location, hobbies, etc. User information may also be inferred even if not directly provided by the user. For example, even the email address linked to the user's account can provide various pieces of information. More particularly, using email suffixes, one can assume that a user account linked to an email ending in .co.uk most likely belongs to someone whose native language is English and who resides (or at least did reside) in the United Kingdom. Likewise, one can assume that a user account linked to an email ending in .fr might be more influenced by French culture than English or American culture.

Additionally, the resource being accessed itself can indicate certain likely password preferences. As mentioned earlier, it is common for gaming and other entertainment applications to attract users who are likely to utilize proper names from the gaming/entertainment application as part of the password, whereas different tendencies are more common for financial resources (e.g., banks, brokerages, etc.). Thus, it is beneficial to obtain the type of the resource as well as the identification of the specific resource being accessed.

The information retrieved by the user/resource feature extractor 102 is then passed to a corpus retriever 104. The corpus retrieve uses the information from the user/resource feature extractor 102 to obtain a plurality of different corpuses 106A-106C. A corpus is a collection of terms used in a particular context. It may be thought of as a dictionary of known terms, although for purposes of the present application the corpus may simply be a list of the known terms for the context.

The corpus retriever 104 may access a repository of known corpuses, or may itself gather information from various outside sources to create corpuses from scratch. For example, a user profile may indicate the user has a hobby of "Baseball", and the user/resource feature extractor 102 may then access online text repositories (e.g., Wikipedia), newspaper websites, fan forums, to identify commonly used terms. Combinations of information from the user and/or resource can also be used to resolve ambiguities. For example, a different corpus may be retrieved if the user lists "Java" as a hobby but whose profile indicates they work in the computer programming industry (the related corpus being one related to the Java operating system) than if the user lists "Java" as a hobby and works in the restaurant industry ((the related corpus being one related to coffee).

Each of the corpuses 106A-106C retrieved by the corpus retriever 104 may be specific to a particular aspect of either the user information or the resource information (or both), and that which has a separate natural language processing (NLP) model 108A-108C associated with it. In FIG. 1, the corpuses 106A-106C include a domain-specific text corpus 106A, which corresponds to a domain-specific NLP model 108A, a language-specific text corpus 106B, which corresponds to a language-specific NLP model 108B, and a hobby-specific text corpus 106C, which corresponds to a hobby-specific NLP model 108C. These are just examples of the corpus/NLP model combinations that may be utilized in the system 100 and are not intended to be limiting. Indeed, any type of information that can be retrieved by the user/resource feature extractor 102 can be the basis for its own corpus/NLP model combination. For example, if the user/resource feature extractor 102 is able to retrieve information about the user's employer, then it is possible to have an employer-specific text corpus and a corresponding employer-specific NLP model.

The NLP models 108A-108C are each able to use large corpuses of unlabeled text data to generate embeddings, which are distributed vectorial representations of words (or n-grams) in text. They are able to generate clusters of words with similar meanings. Examples of such NLP models 108A-108C include Fasttext and Bidirectional Encoder Representations from Transformers (BERT). In contrast with Fasttext, BERT uses context-dependent embeddings. This means that the vector of a word would be different based on its context, whereas models such as Fasttext obtain static word embeddings (context independent). The use of context-dependent representations allows the system 100 to obtain a richer understanding of the function of a word in a text, as language can be ambiguous.

It should also be noted that while FIG. 1 depicts the NLP models 108A-108C as operating independently from one another, there is no requirement that this be the case. The different NLP models 108A-108C may cross-relate information and in some instances can be combined with each other. For example, For an exceptionally large or popular online game, it might be beneficial to have a single NLP model specifically for the combination of both the game itself (domain) and the user's language. Thus, there would be one NLP model for the English version of the game and another NLP model for the French version of the game. For smaller or less popular games, it might be beneficial to have separate NLP models for the game (in all languages) and the language.

Each NLP model 108A-108 may include a rules engine 110A-100C, which performs pre-processing/transformation on each piece of text in the corresponding text corpus 106A-106C. This is used to help address technical jargon in the individual sentences that could adversely affect NLP processing. For example, in some context a period may indicate the end of a sentence whereas in other contexts it may indicate technical jargon, such as a in a uniform resource locator (URL) or computer code. In such instances, the periods in between the parts of the object name are not representative of the end of the sentence, but traditional NLP techniques would consider each period a full stop and terminate the sentence on each. The rules engine 110A-110C applies preprocessing and transformation rules in such a way that technical jargon mentioned in the sentences do not confuse the NLP processing and also helps to ensure that the NLP processing extracts the correct information without losing any contextual data. In other words, the preprocessing changes the technical jargon into content that can be processed by the NLP algorithm.

More particularly, in an example embodiment, a mapping is maintained between technical jargon and alternative terms that do not adversely affect NLP processing. In a further example embodiment, this mapping may be customized for different industries or groups of users. Thus, there may be multiple mappings and the mapping corresponding to the industry or group of user to which the overall process is being applied can be retrieved and used when needed. The rules engine 106 also categorizes sentences as either "information only" or "action involved".

Each transformed text portion is then passed to an NLP engine 112A-112C. The NLP engine 112A-112C applies one or more NLP rules to the input text portion, filters words into grammatical entities, and produces structured text portion objects. More particularly the NLP engine 112A-112C determines a grammatical type (e.g., noun, verb, etc.) for each word, and the dependencies between each word. Each dependency is indicative of the grammatical relationship between words, such as whether one of words is a direct object of the other word, punctuation for another word, adverbial clause modifier (advcl) for the other word, etc.

NLP processing may include general filtering actions such as removing unwanted words and characters from the text. This may include removing unnecessary spaces, removing standard punctuations such as !"#$%&'( )+,-./:;<=>?@\]^_'{|}~, keeping only characters containing the letters a-z and the numbers 0-9, normalizing case (such as by converting everything to lowercase), removing stop words such as 'i', 'me', 'my', 'myself', 'we', 'our', 'ours', 'ourselves', 'you', 'your', 'yours', 'yourself', 'yourselves', 'he', 'him', 'his', etc., removing greeting words such as "hi, hello, regards, kind, regards, etc.", and the replacing of some words with regular expressions. Additionally, stemming and lemmatization of words may be performed. Stemming and Lemmatization are text normalization techniques. Stemming is the process of reducing inflection in words to their root forms, such as mapping a group of words to the same stem even if the stem itself is not a valid word in the language. Thus, stemming a word involves removing prefixes and suffixes. Lemmatization, on the other hand, reduces the inflected words to a root form that is part of the language. This root word is called a lemma. Lemmatization involves identifying a canonical version of a word, and the canonical version may involve more or less than merely removing suffixes and prefixes. For example, ran, run, and running may be lemmatized to the canonical word "run", even though changing ran to run does not involve adding or removing suffixes.

The NLP engine 112A-112C finds out all the grammatical dependency objects in the text portion, the relationships among objects, the conditions involved in the text portion, and then, based on all this information, prepares the context of the text portion.

The NLP learns how to parse a text portion and assign an embedding to the text portion based on the parsing. The embedding identifies a set of coordinates (called a vector) in a multidimensional space to each parsed sentence. One or more similarity measures between coordinates may then be used to identify the similarity between corresponding sentences. One example metric is cosine similarity. In cosine similarity, the cosine of the angle between two vectors is computed. The cosine similarity of two sentences will range from 0 to 1. If the cosine similarity is 1, it means the two vectors have the same orientation and thus are identical. Values closer to 0 indicate less similarity. Other measures of similarity may be used, in lieu of or in addition to the cosine similarity, such as Euclidean distance and Jaccard similarity. Additionally, these baseline metrics can be improved by methods such as ignoring "stop" words and computing averages weighted by term frequency—inverse document frequency (TF-IDF). Alternatively, techniques such as Word Mover's Distance (WMD) and Smooth Inverse Frequency (SIF) can also be employed.

Figure 2:
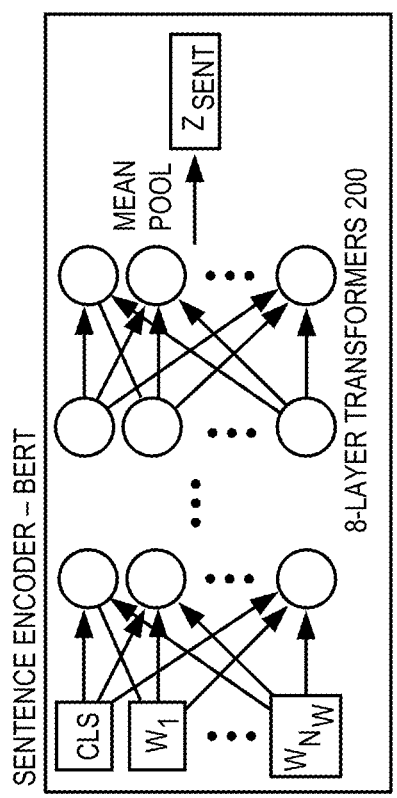
FIG. 2 is a block diagram illustrating BERT in accordance with an example embodiment.

In an example embodiment, Bidirectional Encoder Representations from Transformers (BERT) are used to encode text portions into embeddings in the. It should be noted that BERT is merely used in some example embodiments, and in others another language model can be used in lieu of BERT. FIG. 2 is a block diagram illustrating BERT in accordance with an example embodiment. BERT uses transformer layer(s) 200 to encode the input sentence to embedding. Each transformer layer is defined as follows:

$$TFLayer(h^{n-1}) = FC(MultiAttn(h^{n-1}));$$

$$FC(x) = relu(xW_1 + b_1)W_2 + b_2;$$

$$MultiAttn(h^{n-1}) = concat(head_1(h^{n-1}), \ldots, head_k(h^{n-1}))W^O,$$

$$head_i(h^{n-1}) = softmax\left(\frac{(h^{n-1}W_q^i)(h^{n-1}W_k^i)}{\sqrt{d_k}}\right)(h^{n-1}W_v^i).$$

where $h^{n-1}$ is the output of the previous transformer layer. Here, a BERT model with 8 transformer layers is used, and the output sentence embedding $z_{sent}$ is defined as the mean-pooling result of the last transformer layer's output. For simplicity, batch normalization and residual connections are omitted in the equations.

The embeddings from the NLP Engines 112A-112C are then passed to a probabilistic context free grammar (PCFG) machine-learned model 114, which learns the syntactic and semantic characteristics of a password vocabulary exploiting the previously defined semantic categories. The use of semantic categories reduces the search space the guesser needs to explore to find the most probable passwords. The PCFG machine-learned model 114 produces competitive results while using a relatively small number of samples and benefits from semantic categories. It should be noted that due to these benefits, that the PCFG machine-learned model 114 differs from prior art machine-learned models, which are typically deep learning models.

It should be noted that the term "machine-learned model" as used throughout this disclosure is intended to describe a model that has been learned via a machine-learning technique. This term shall not be interpreted as limiting the model to only being one that is fully trained and never trained again. Indeed, as will be described elsewhere in this document, the machine-learned model may be retrained at a later date, and could also be continually retrained as it is used. Some in the computing community may refer to a machine-learned model as a "machine-learning model."

The PCFG machine-learned model 114 may include:
A set of terminals $\Sigma$ formed by the vocabulary of the Corpus: $\Sigma = w_1, w_2, \ldots, w_v$,
A set of non-terminals, or variables V, which are the syntactic categories of the grammar.
A star symbol $N_1$
A set of rules, $N_i \rightarrow \zeta_j$, where $\zeta_j$ is a sequence of terminals or non-terminals. And follows: $\Sigma_j P(N_i \rightarrow \zeta_j i) = 1, \forall i$ In the context of password security, a PCFG first splits the elements in a string into similar groups. For instance, under the first implementation of this method the password "seville! 1994" will be divided into the letter segment L "seville" of length 7, a symbol segment D "!" of length 1, and a digit segment D "1994" of length 4. Providing the base structures $\zeta_i = L_7, S_1, D_4$, which will have a probability:

$$P(\zeta_i) = \frac{\text{Occurences of } \zeta_i}{\text{Occurences of all base structures } \zeta_n}$$

Then the probability of a guess will be equal to the product of the production (non-terminal base structures and terminals). Thus, for this example the probability of "seville!1994", which may be denoted as $P(\zeta_a)$ is:

$$P(\zeta_a) = P(\zeta_i)P(w_{L_x})P(w_{S_y})P(W_{D_z})$$

$$P(\zeta_a) = P(L_7, S_1, D_4)P(L_7 \to \text{"seville"})P(S_1 \to \text{"!"})P(D_4 \to \text{"1994"})$$

With $(w_{L_x}) \cup (w_{S_y}) \cup (w_{D_z}) = \zeta_i$

In an example embodiment, instead of assuming the naïve letter, symbol and digit, one may use the semantic categories obtained with unsupervised NLP learning methods. These classes served to build the base structures and compute the terminal probabilities.

To generate guesses, priority queues may be used to progressively add candidate guesses and achieve the goals of avoiding duplicates by parsing the tree once, generating parses in probability order, and minimizing time and memory requirements. This results in lopsided trees that avoid duplicate nodes.

A context-free grammar (CFG) is a formal grammar whose production rules are of the form A→α with A being a single nonterminal symbol, and a string of terminals and/or nonterminals (α can be empty). A formal grammar is "context free" if its production rules can be applied regardless of the context of a nonterminal. No matter which symbols surround it, the single nonterminal on the left hand side can always be replaced by the right hand side. This is what distinguishes it from a context-sensitive grammar.

A formal grammar is essentially a set of production rules that describe all possible strings in a given formal language. Production rules are simple replacements. For example, the first rule in the picture, <Stmt>→<Id>=<Expr>; replaces <Stmt> with <ID>=<Expr>;

There can be multiple replacement rules for a given nonterminal symbol. The language generated by a grammar is the set of all strings of terminal symbols that can be derived, by repeated rule applications, from some particular nonterminal symbol ("start symbol"). Nonterminal symbols are used during the derivation process, but do not appear in its final result string.

Languages generated by context-free grammars are known as context-free languages (CFL). Different context-free grammars can generate the same context-free language. It is important to distinguish the properties of the language (intrinsic properties) from the properties of a particular grammar (extrinsic properties).

PCFGs extend context-free grammars similar to how hidden Markov models extend regular grammars. Each production is assigned a probability. The probability of a derivation (parse) is the product of the probabilities of the productions used in that derivation. These probabilities can be viewed as parameters of the model. In an example embodiment, these parameters are learned via machine learning. A probabilistic grammar's validity is constrained by context of its training dataset.

In the context of password security, the PCFG machine-learned model first splits the elements in a string into similar groups. For example, the password "Seville! 1994" may be divided into the letter segment L "Seville" of length 7, a symbol segment S "!" of length 1, and a digit segment D "1994" of length 4. Providing the base structure $\zeta_i = L_7, S_1, D_4$, which will have a probability:

$$P(\zeta_i) = \frac{\text{Occurences of } \zeta_i}{\text{Occurences of all base structures } \zeta_n}.$$

Then the probability of a guess will be equal to the product of the production (non-terminal base structures and terminals). Thus, for this example, the probability of "Seville! 1994", which is denoted as $P(\zeta_a)$ is:

$$P(\zeta_a) = P(\zeta_i)P(w_{L_x})P(w_{S_y})P(W_{D_z})$$

$$P(\zeta_a) = P(L_7, S_1, D_4)P(L_7 \to \text{"seville"})P(S_1 \to \text{"!"})P(D_4 \to \text{"1994"})$$

With $(w_{L_x}) \cup (w_{S_y}) \cup (w_{D_z}) = \zeta_i$

In this approach, instead of assuming the naïve letter, symbol, and digit, the semantic categories obtained with specialized lists are used with unsupervised learning methods. These classes serve to build the base structures and compute the terminal probabilities. Moreover, individual transitions do not impact each other. By using a PCFG, one assumes the probabilities in the base structures are independent. In reality, there can be dependencies between the terminals, but the simplification has proven to be effective while keeping the complexity of the model and the computational resources used low. Additionally, the transitions of the grammar are non-ambiguous. Every terminal value will be associated with only one rule.

Furthermore, in an example embodiment, a graph produced by the PCFG machine-learned model 114 will follow a hierarchical structure with no backwards jumps. Thus, recursion is not allowed. Additionally, naïve implementations of PCFG might interpret "Cat", "cat", and "CAT" as different terminals, but an example embodiment groups terminal values according to their lower-case version.

The output of the PCFG machine-learned model 114 is a set of password guesses in ranked order, based on their likelihoods of being guessed.

In order to keep the number of guesses (as well as the related computational times and memory resources) to a minimum, an algorithm that parses the generated tree using an efficient strategy may be used, as opposed to producing all possible combinations in each base structure. To generate guesses, a "next" algorithm is used, which uses priority queues to progressively add candidate guesses and achieves the goals of avoiding duplicates by parsing the tree once, generating parses in probability order, and minimizing time and memory needs. This results in lopsided trees that avoid duplicate nodes.

In an example embodiment, in order to further reduce the number of password guesses produced by the PCFG machine-learned model, an order-of-magnitude limit is imposed. For example, the PCFG machine-learned model 114 may be designed to output no more than a number of password guess on the order of $10^9$.

An example use case is as follows. A group of researchers from an online gaming platform are in charge of designing a password-security checker to encourage users to use secure passwords. Suddenly, the platform releases a new video game that becomes an instant hit. Soon after its release, the game gathers a community of millions of users across the globe. These users create new usernames and passwords on the platform to play the game, and it is possible that a number of them will start constructing passwords which use references based on their new favorite game.

A previous password-guessing model would be obsolete as there would be no information or references on the new characters, story lines and slang surrounding the new game. A possible solution would be to require the researchers to manually craft specialized lists of the vocabulary relevant to the game, but this process would be tedious and time consuming. Furthermore, it would require the researchers to be familiarized with the game, which might not be the case. Nevertheless, across the online world numerous articles from e-sports media would be released, forums filled with user discussions on the best tactics to defeat a boss would start to emerge. This is a new cohort of texts, written in natural language and specialized on the topic of interest that has been created "for free" (i.e. not at the expense of the researchers' time). Use of an example embodiment described herein would allow the researchers of developers to generate updated password guesses without using manually constructed specialized lists with vocabulary from the game.

Thus, each time the PCFG machine-learned model is fed new information from the corpus retriever, it is updating its model to produce new password guesses (and possibly remove old password guesses). A password checker or password safety meter may then utilize updated password guesses in an efficient manner.

Figure 3:
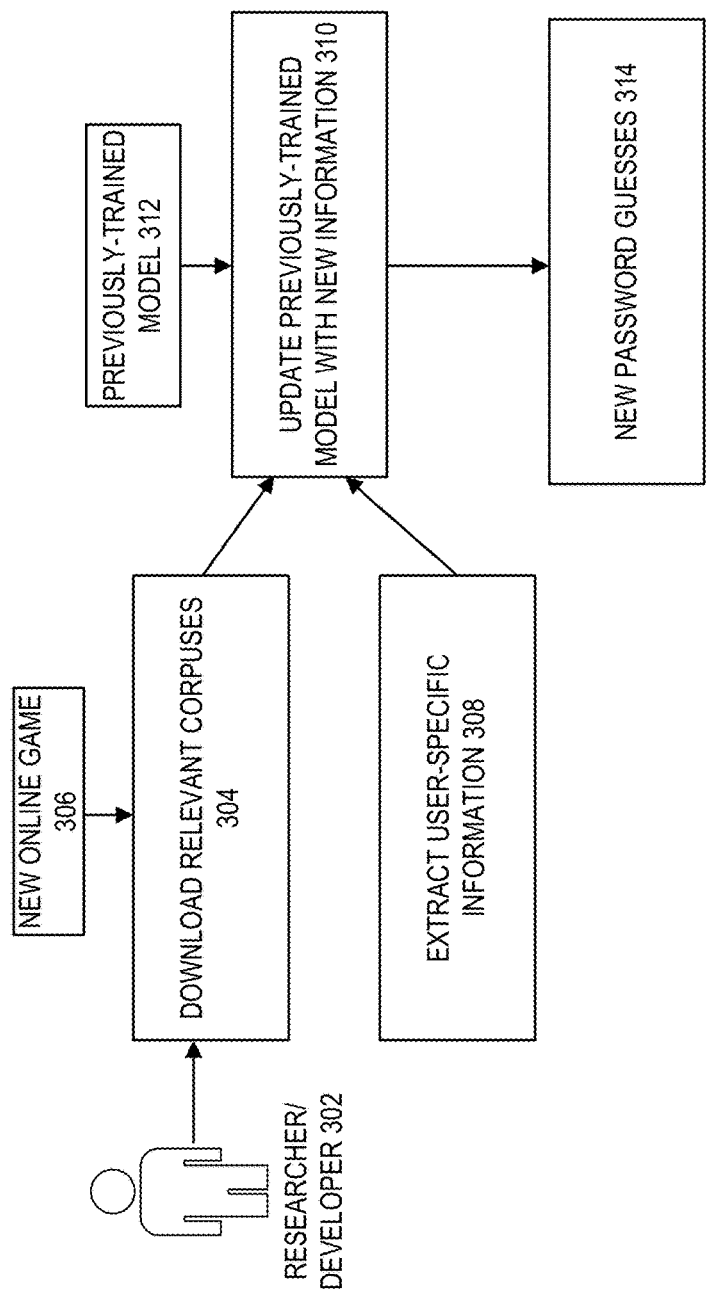
FIG. 3 is a flow diagram illustrating an example process 300 of how a researcher or developer could generate password guesses for a new video game.

FIG. 3 is a flow diagram illustrating an example process 300 of how a researcher or developer could generate password guesses for a new video game. Specifically, at operation 304, researcher/developer 302 can trigger the corpus retriever to download relevant online texts, such as press releases, forums, and gaming blogs, relevant to the new online video game 306. At operation 308, the corpus retriever can also extract user-specific information, such as hobbies, native language, etc. The information from operations 304 and 308 are then passed to operation 310, which updates a previously trained model 312 with new information, using the aforementioned natural language processing and PCFG techniques. The results are new password guesses 314, which may be used within a password security checker to encourage safer passwords.

Figure 4:
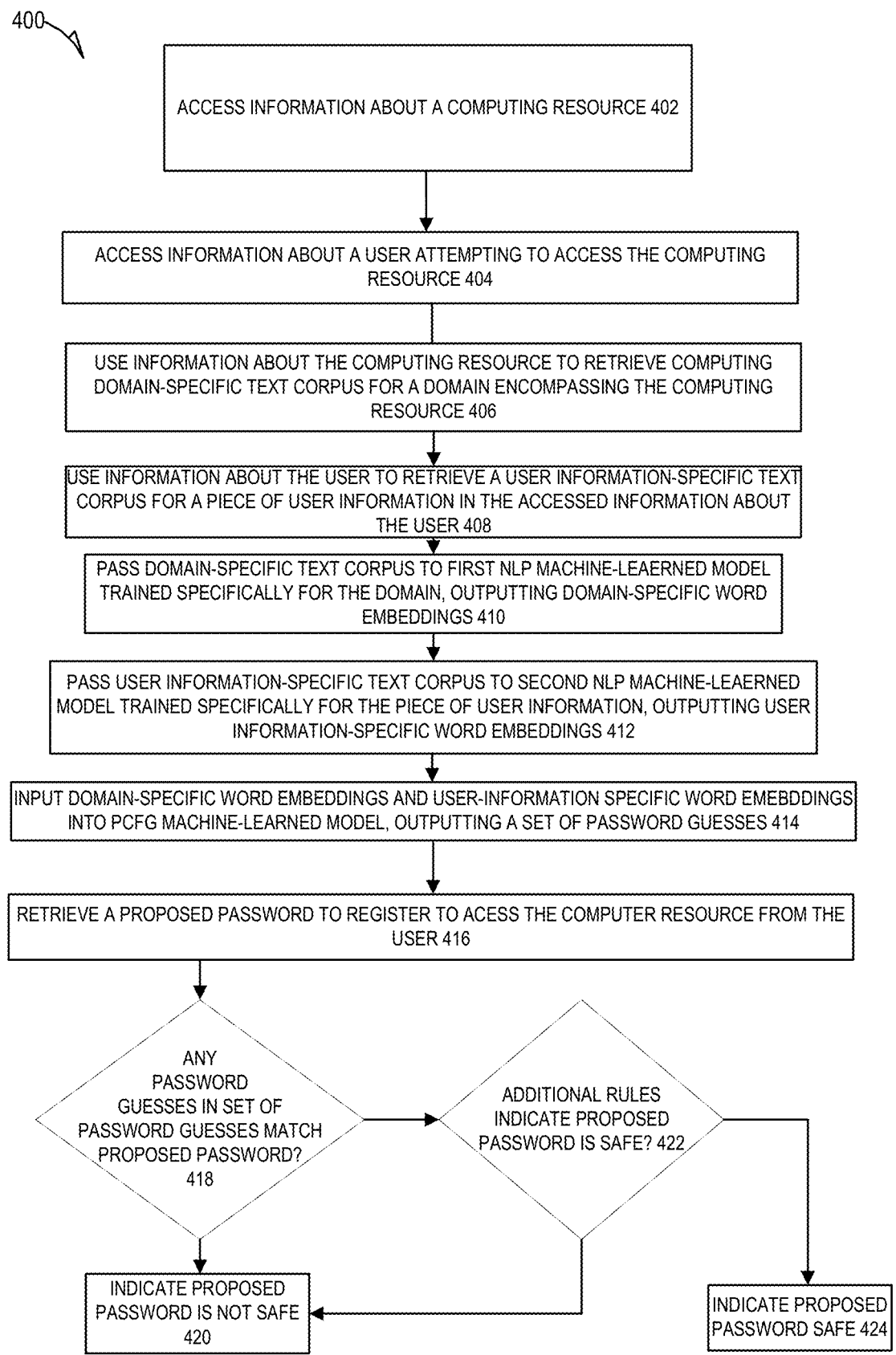
FIG. 4 is a flow diagram illustrating a method 400 for using machine learning to generate password guesses for a computing resource, in accordance with an example embodiment.

FIG. 4 is a flow diagram illustrating a method 400 for using machine learning to generate password guesses for a computing resource, in accordance with an example embodiment. At operation 402, information about a computing resource is accessed. At operation 404, information about a user attempting to access the computing resource is accessed. At operation 406, information about the computing resource is used to retrieve a computing domain-specific text corpus for a domain encompassing the computing resource. At operation 408, the information about the user is used to retrieve a user information-specific text corpus for a piece of user information in the accessed information about the user.

At operation 410, the domain-specific text corpus is passed to a first NLP machine-learned model trained specifically for the domain, the first NLP machine-learned model outputting domain-specific word embeddings. At operation 412, the user information-specific text corpus is passed to a second NLP machine-learned model trained specifically for the piece of user information, the second NLP machine-learned model outputting user information-specific word embeddings.

At operation 414, the domain-specific word embeddings and the user information-specific word embeddings are input into a PCFG machine-learned model, the PCFG machine-learned model updating itself based on the input and outputting a set of password guesses.

At operation 416, a proposed password to register to access the computing resource is received from the user. At operation 418, the set of password guesses is scanned to determine whether the proposed password contains any password guesses in the set of password guesses. If so, then at operation 420, an indication to the user that the proposed password is not safe is provided. If not, then at operation 422, additional rules may be applied to determine whether the proposed password is safe. If not, then the process 400 proceeds to operation 420. If so, then at operation 424 an indication to the user that the proposed password is safe is provided.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a non-transitory computer-readable medium storing instructions that, when executed by the at least one hardware processor, cause the at least one hardware processor to perform operations comprising:
accessing information about a computing resource;
accessing information about a user attempting to access the computing resource;
using the information about the computing resource to retrieve a computing domain-specific text corpus for a domain encompassing the computing resource;
using the information about the user to retrieve a user information-specific text corpus for a piece of user information in the accessed information about the user;
passing the domain-specific text corpus to a first natural language processing (NLP) machine-learned model trained specifically for the domain, the first NLP machine-learned model outputting domain-specific word embeddings;
passing the user information-specific text corpus to a second NLP machine-learned model trained specifically for the piece of user information, the second NLP machine-learned model outputting user information-specific word embeddings; and
inputting the domain-specific word embeddings and the user information-specific word embeddings into a probabilistic context free grammar (PCFG) machine-learned model, the PCFG machine-learned model updating itself based on the input and outputting a set of password guesses.

Example 2. The system of Example 1, wherein the operations further comprise:
receiving a proposed password to register to access the computing resource from the user;
scanning the set of password guesses to determine whether the proposed password contains any password guesses in the set of password guesses;
in response to a determination that the proposed password contains at least one password guess in the set of password guesses, providing an indication to the user that the proposed password is not safe.

Example 3. The system of Example 1 or 2, wherein the set of password guesses is output by the PCFC machine-learned model in ranked order of likelihood of being guessed.

Example 4. The system of any of Examples 1-3, wherein the first NLP machine-learned model and the second NLP machine-learned model are bidirectional encoder representations from Transformers (BERT) model.

Example 5. The system of any of Examples 1-4, wherein the piece of user information is a language spoken by the user.

Example 6. The system of Example 5, wherein the language spoken by the user is inferred from an email address suffix for an email address of the user.

Example 7. The system of any of Examples 1-6, wherein the piece of user information is geographic location of the user.

Example 8. The system of any of Examples 1-7, further comprising:
  using the information about the user to retrieve second user information-specific text corpus for a second piece of user information in the accessed information about the user;
  passing the second user information-specific text corpus to a third NLP machine-learned model trained specifically for the second piece of user information, the third NLP machine-learned model outputting second user information-specific word embeddings; and
  inputting the second user information-specific word embeddings into the PCFG.

Example 9. The system of Example 8, wherein the second user-information specific text corpus is specific for a hobby of the user.

Example 10. The system of any of Examples 1-9, wherein the domain-specific text corpus is also user information specific about a second piece of information about the user.

Example 11. A method comprising:
  accessing information about a computing resource;
  accessing information about a user attempting to access the computing resource;
  using the information about the computing resource to retrieve a computing domain-specific text corpus for a domain encompassing the computing resource;
  using the information about the user to retrieve a user information-specific text corpus for a piece of user information in the accessed information about the user;
  passing the domain-specific text corpus to a first natural language processing (NLP) machine-learned model trained specifically for the domain, the first NLP machine-learned model outputting domain-specific word embeddings;
  passing the user information-specific text corpus to a second NLP machine-learned model trained specifically for the piece of user information, the second NLP machine-learned model outputting user information-specific word embeddings; and
  inputting the domain-specific word embeddings and the user information-specific word embeddings into a probabilistic context free grammar (PCFG) machine-learned model, the PCFG machine-learned model updating itself based on the input and outputting a set of password guesses.

Example 12. The method of Example 11, further comprising:
  receiving a proposed password to register to access the computing resource from the user;
  scanning the set of password guesses to determine whether the proposed password contains any password guesses in the set of password guesses;
  in response to a determination that the proposed password contains at least one password guess in the set of password guesses, providing an indication to the user that the proposed password is not safe.

Example 13. The method of Example 11 or 12, wherein the set of password guesses is output by the PCFC machine-learned model in ranked order of likelihood of being guessed.

Example 14. The method of any of Examples 11-13, wherein the first NLP machine-learned model and the second NLP machine-learned model are bidirectional encoder representations from Transformers (BERT) model.

Example 15. The method of any of Examples 11-14, wherein the piece of user information is a language spoken by the user.

Example 16. The method of Example 15, wherein the language spoken by the user is inferred from an email address suffix for an email address of the user.

Example 17. The method of any of Examples 11-16, wherein the piece of user information is geographic location of the user.

Example 18. The method of any of Examples 11-17, further comprising:
  using the information about the user to retrieve second user information-specific text corpus for a second piece of user information in the accessed information about the user;
  passing the second user information-specific text corpus to a third NLP machine-learned model trained specifically for the second piece of user information, the third NLP machine-learned model outputting second user information-specific word embeddings; and
  inputting the second user information-specific word embeddings into the PCFG.

Example 19. The method of Example 18, wherein the second user-information specific text corpus is specific for a hobby of the user.

Example 20. A non-transitory machine-readable medium storing instructions which, when executed by one or more processors, cause the one or more processors to perform operations comprising:
  accessing information about a computing resource;
  accessing information about a user attempting to access the computing resource;
  using the information about the computing resource to retrieve a computing domain-specific text corpus for a domain encompassing the computing resource;
  using the information about the user to retrieve a user information-specific text corpus for a piece of user information in the accessed information about the user;
  passing the domain-specific text corpus to a first natural language processing (NLP) machine-learned model trained specifically for the domain, the first NLP machine-learned model outputting domain-specific word embeddings;
  passing the user information-specific text corpus to a second NLP machine-learned model trained specifically for the piece of user information, the second NLP machine-learned model outputting user information-specific word embeddings; and
  inputting the domain-specific word embeddings and the user information-specific word embeddings into a probabilistic context free grammargrammar (PCFG) machine-learned model, the PCFG machine-learned model updating itself based on the input and outputting a set of password guesses.

Figure 5:
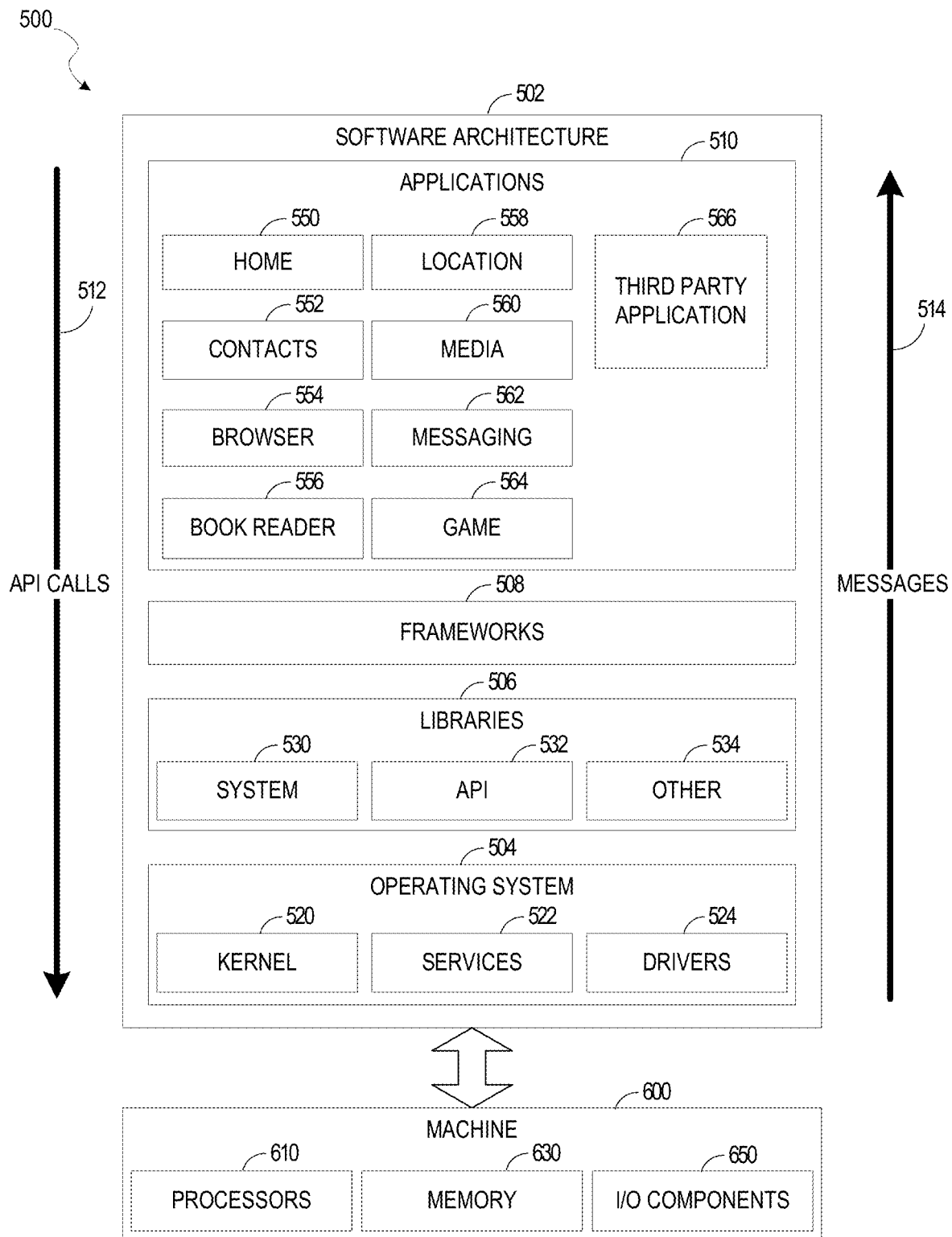
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
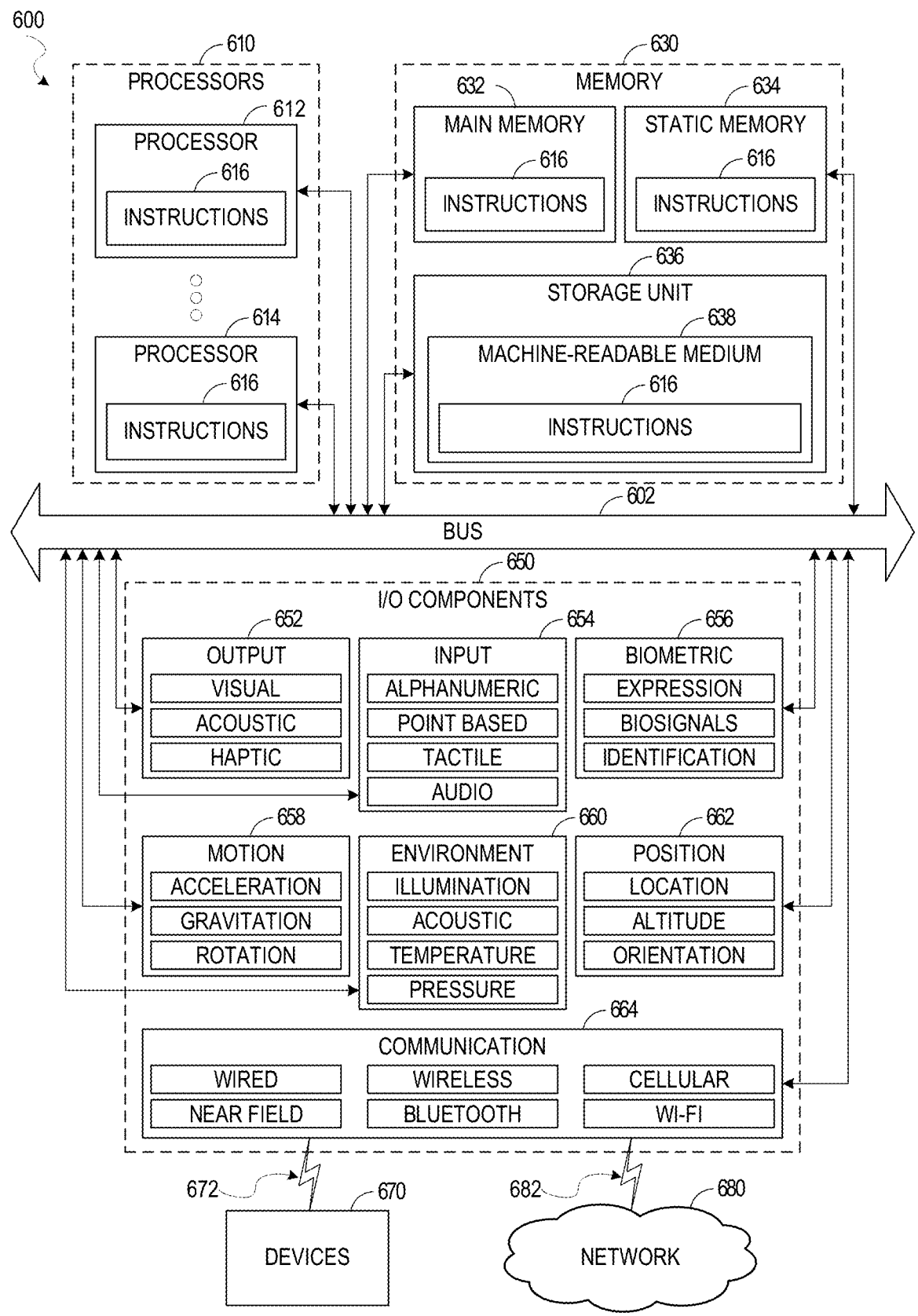
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the methods of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a non-transitory computer-readable medium storing instructions that, when executed by the at least one hardware processor, cause the at least one hardware processor to perform operations comprising:
   accessing information about a computing resource;
   accessing information about a user attempting to access the computing resource;
   using the information about the computing resource to retrieve a computing domain-specific text corpus for a domain encompassing the computing resource;
   using the information about the user to retrieve a user information-specific text corpus for a piece of user information in the accessed information about the user;
   passing the domain-specific text corpus to a first natural language processing (NLP) machine-learned model trained specifically for the domain, a first NLP machine-learned model outputting domain-specific word embeddings;
   passing the user information-specific text corpus to a second NLP machine-learned model trained specifically for the piece of user information, the second NLP machine-learned model outputting user information-specific word embeddings; and
   inputting the domain-specific word embeddings and the user information-specific word embeddings into a probabilistic context free grammar (PCFG) machine-learned model, the PCFG machine-learned model updating itself based on the input and outputting a set of password guesses.

2. The system of claim 1, wherein the operations further comprise:
   receiving a proposed password to register to access the computing resource from the user;
   scanning the set of password guesses to determine whether the proposed password contains any password guesses in the set of password guesses; and
   in response to a determination that the proposed password contains at least one password guess in the set of password guesses, providing an indication to the user that the proposed password is not safe.

3. The system of claim 1, wherein the set of password guesses is output by a PCFC machine-learned model in ranked order of likelihood of being guessed.

4. The system of claim 1, wherein the first NLP machine-learned model and a second NLP machine-learned model are bidirectional encoder representations from Transformers (BERT) model.

5. The system of claim 1, wherein the piece of user information is a language spoken by the user.

6. The system of claim 5, wherein the language spoken by the user is inferred from an email address suffix for an email address of the user.

7. The system of claim 1, wherein the piece of user information is geographic location of the user.

8. The system of claim 1, further comprising:
using the information about the user to retrieve second user information-specific text corpus for a second piece of user information in the accessed information about the user;
passing the second user information-specific text corpus to a third NLP machine-learned model trained specifically for the second piece of user information, the third NLP machine-learned model outputting second user information-specific word embeddings; and
inputting the second user information-specific word embeddings into the PCFG.

9. The system of claim 8, wherein the second user information specific text corpus is specific for a hobby of the user.

10. The system of claim 1, wherein the domain-specific text corpus is also user information specific about a second piece of information about the user.

11. A method comprising:
accessing information about a computing resource;
accessing information about a user attempting to access the computing resource;
using the information about the computing resource to retrieve a computing domain-specific text corpus for a domain encompassing the computing resource;
using the information about the user to retrieve a user information-specific text corpus for a piece of user information in the accessed information about the user;
passing the domain-specific text corpus to a first natural language processing (NLP) machine-learned model trained specifically for the domain, the first NLP machine-learned model outputting domain-specific word embeddings;
passing the user information-specific text corpus to a second NLP machine-learned model trained specifically for the piece of user information, the second NLP machine-learned model outputting user information-specific word embeddings; and
inputting the domain-specific word embeddings and the user information-specific word embeddings into a probabilistic context free grammar (PCFG) machine-learned model, the PCFG machine-learned model updating itself based on the input and outputting a set of password guesses.

12. The method of claim 11, further comprising:
receiving a proposed password to register to access the computing resource from the user;
scanning the set of password guesses to determine whether the proposed password contains any password guesses in the set of password guesses; and
in response to a determination that the proposed password contains at least one password guess in the set of password guesses, providing an indication to the user that the proposed password is not safe.

13. The method of claim 11, wherein the set of password guesses is output by the PCFG machine-learned model in ranked order of likelihood of being guessed.

14. The method of claim 11, wherein the first NLP machine-learned model and the second NLP machine-learned model are bidirectional encoder representations from Transformers (BERT) model.

15. The method of claim 11, wherein the piece of user information is a language spoken by the user.

16. The method of claim 15, wherein the language spoken by the user is inferred from an email address suffix for an email address of the user.

17. The method of claim 11, wherein the piece of user information is geographic location of the user.

18. The method of claim 11, further comprising:
using the information about the user to retrieve second user information-specific text corpus for a second piece of user information in the accessed information about the user;
passing the second user information-specific text corpus to a third NLP machine-learned model trained specifically for the second piece of user information, the third NLP machine-learned model outputting second user information-specific word embeddings; and
inputting the second user information-specific word embeddings into the PCFG.

19. The method of claim 18, wherein the second user information specific text corpus is specific for a hobby of the user.

20. A non-transitory machine-readable medium storing instructions which, when executed by one or more processors, cause the one or more processors to perform operations comprising:
accessing information about a computing resource;
accessing information about a user attempting to access the computing resource;
using the information about the computing resource to retrieve a computing domain-specific text corpus for a domain encompassing the computing resource;
using the information about the user to retrieve a user information-specific text corpus for a piece of user information in the accessed information about the user;
passing the domain-specific text corpus to a first natural language processing (NLP) machine-learned model trained specifically for the domain, the first NLP machine-learned model outputting domain-specific word embeddings;
passing the user information-specific text corpus to a second NLP machine-learned model trained specifically for the piece of user information, the second NLP machine-learned model outputting user information-specific word embeddings; and
inputting the domain-specific word embeddings and the user information-specific word embeddings into a probabilistic context free grammar (PCFG) machine-learned model, the PCFG machine-learned model updating itself based on the input and outputting a set of password guesses.

* * * * *